(12) United States Patent
Wessel et al.

(10) Patent No.: US 11,100,951 B2
(45) Date of Patent: *Aug. 24, 2021

(54) HEAT-ASSISTED MAGNETIC RECORDING DEVICE INCORPORATING LASER HEATER FOR IMPROVED LASER STABILITY

(71) Applicant: Seagate Technology LLC, Fremont, CA (US)

(72) Inventors: James Gary Wessel, Savage, MN (US); Roger L. Hipwell, Jr., Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,101

(22) Filed: Jul. 24, 2020

(65) Prior Publication Data

US 2020/0365181 A1 Nov. 19, 2020

Related U.S. Application Data

(63) Continuation of application No. 16/591,892, filed on Oct. 3, 2019, now Pat. No. 10,783,918.

(Continued)

(51) Int. Cl.
*G11B 5/00* (2006.01)
*G11B 13/08* (2006.01)

(52) U.S. Cl.
CPC ...... *G11B 13/08* (2013.01); *G11B 2005/0021* (2013.01)

(58) Field of Classification Search
CPC ........ G11B 11/1051; G11B 2005/0021; G11B 11/105; G11B 5/00; G11B 5/6088;
(Continued)

(56) References Cited

U.S. PATENT DOCUMENTS 8,441,896 B2   5/2013   Wang et al.
8,897,103 B2   11/2014  Alex
(Continued)

FOREIGN PATENT DOCUMENTS

CN   102298931   12/2011
CN   103021426   4/2013
(Continued)

OTHER PUBLICATIONS

Sakano et al., "Tunable DFB Laser with a Striped Thin-Film Heater", IEEE Photonics Technology Letters, vol. 4, No. 4, Apr. 1992, pp. 321-323.
(Continued)

*Primary Examiner* — Nabil Z Hindi
(74) *Attorney, Agent, or Firm* — Mueting Raasch Group

(57) ABSTRACT

An apparatus comprises a slider configured to facilitate heat assisted magnetic recording and a submount affixed to the slider. A laser unit is affixed to the submount and comprises a laser operable in a non-lasing state and a lasing state. A heater is embedded in the laser unit or the submount. The heater is configured to generate preheat for heating the laser during the non-lasing state and to generate steering heat for heating the laser during the lasing state.

20 Claims, 13 Drawing Sheets

Related U.S. Application Data

(60) Provisional application No. 62/744,729, filed on Oct. 12, 2018.

(58) Field of Classification Search
CPC .......... G11B 11/10511; G11B 5/59633; G11B 5/59627; G11B 5/59655
USPC ................ 360/59, 313, 75; 369/13.33, 13.32
See application file for complete search history.

(56) References Cited

U.S. PATENT DOCUMENTS

| | | |
|---|---|---|
| 9,088,124 B2 | 7/2015 | Olson |
| 9,202,499 B2 | 12/2015 | Kiely et al. |
| 9,236,081 B1 | 1/2016 | Chu et al. |
| 9,418,691 B2 | 8/2016 | Peng et al. |
| 9,653,121 B1 | 5/2017 | Chu et al. |
| 9,905,996 B2 | 2/2018 | Wessel et al. |
| 9,916,851 B1 | 3/2018 | Seigler et al. |
| 9,980,395 B2 | 5/2018 | Shimazawa et al. |
| 9,984,719 B2 | 5/2018 | Matousek et al. |
| 10,192,578 B1 | 1/2019 | Macken et al. |
| 10,283,151 B1 | 5/2019 | Wessel et al. |
| 10,325,622 B2 | 6/2019 | Tatah et al. |
| 10,366,722 B1 | 7/2019 | Mendonsa et al. |
| 10,540,998 B2 | 1/2020 | Tatah et al. |
| 10,783,918 B2 * | 9/2020 | Wessel .................. G11B 13/08 |
| 2009/0040645 A1 | 2/2009 | Shimazawa et al. |
| 2013/0064051 A1 | 3/2013 | Peng et al. |

FOREIGN PATENT DOCUMENTS

| | | |
|---|---|---|
| CN | 103440874 | 12/2013 |
| CN | 103680521 | 3/2014 |
| CN | 104050981 | 9/2014 |
| CN | 106024021 | 10/2016 |
| CN | 106898366 | 6/2017 |

OTHER PUBLICATIONS

Office Action from CN Application No. 201910974345.X dated Nov. 23, 2020, 27 pages.

* cited by examiner

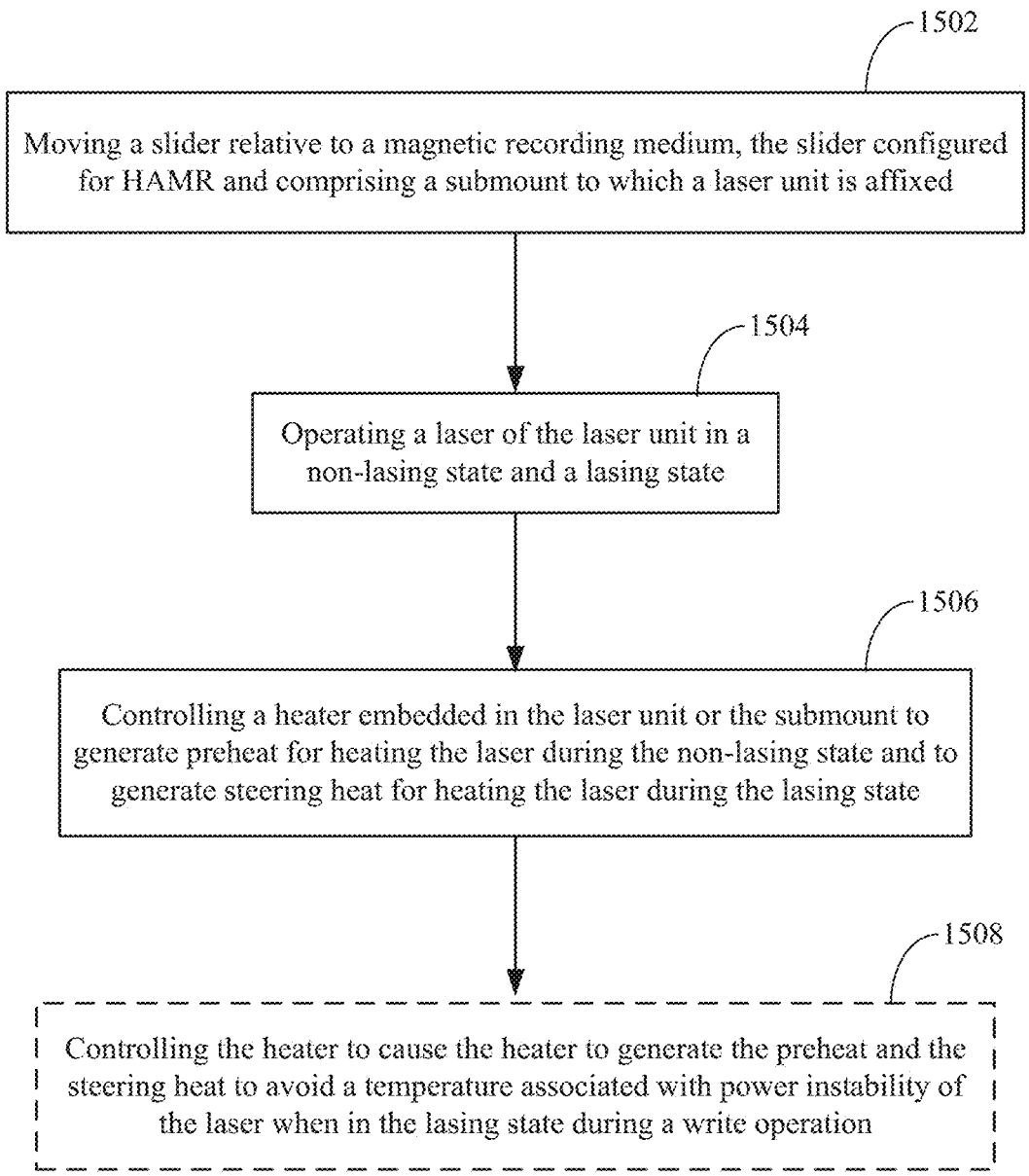

HEAT-ASSISTED MAGNETIC RECORDING DEVICE INCORPORATING LASER HEATER FOR IMPROVED LASER STABILITY

RELATED APPLICATIONS

This application is a continuation of U.S. patent application Ser. No. 16/591,892, filed Oct. 3, 2019, which claims the benefit of Provisional Patent Application Ser. No. 62/744,729 filed on Oct. 12, 2018, which are hereby incorporated herein by reference in their entireties.

SUMMARY

Embodiments are directed to an apparatus comprising a slider configured to facilitate heat assisted magnetic recording and a submount affixed to the slider. A laser unit is affixed to the submount and comprises a laser operable in a non-lasing state and a lasing state. A heater is embedded in the laser unit or the submount. The heater is configured to generate preheat for heating the laser during the non-lasing state and to generate steering heat for heating the laser during the lasing state.

Embodiments are directed to an apparatus comprising a slider configured to facilitate heat assisted magnetic recording and a submount affixed to the slider. A laser unit is affixed to the submount and comprises a laser operable in a non-lasing state and a lasing state. A heater is embedded in the laser unit or the submount. Control circuitry is coupled the laser unit and the heater. The control circuitry is configured to cause the heater to generate preheat for heating the laser during the non-lasing state and to cause the heater to generate steering heat for heating the laser during the lasing state.

Embodiments are directed to a method comprising moving a slider relative to a magnetic recording medium, the slider configured for heat assisted magnetic recording and comprising a submount to which a laser unit is affixed. The method also involves operating a laser of the laser unit in a non-lasing state and a lasing state. The method further involves controlling a heater embedded in the laser unit or the submount to generate preheat for heating the laser during the non-lasing state and to generate steering heat for heating the laser during the lasing state.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 15 is a flow chart showing processes for heating a laser of a heat assisted magnetic recording slider in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording, also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to superparamagnetic effects that can lead to data errors.

Figure 1:
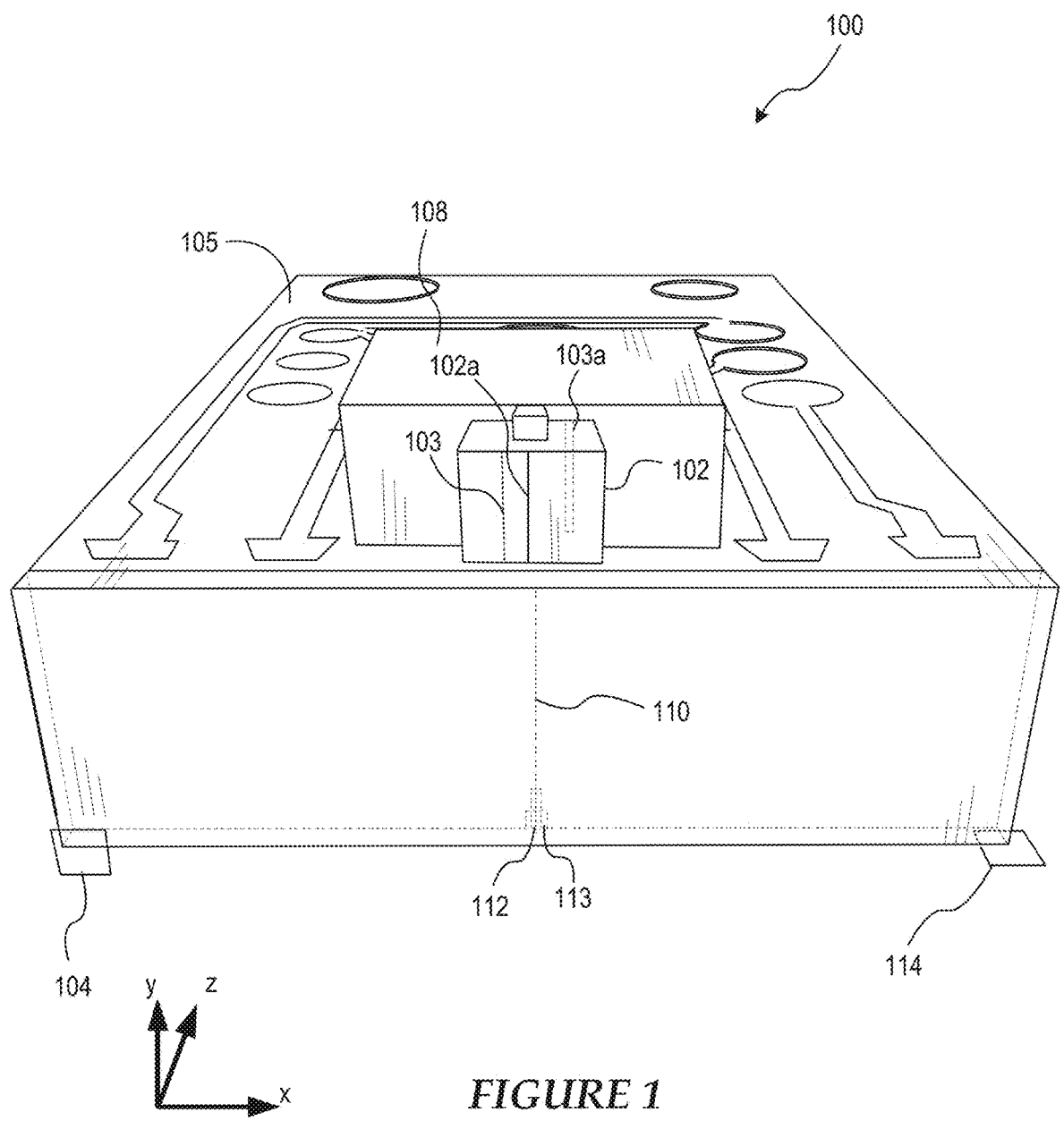
FIG. 1 shows a heat-assisted magnetic recording (HAMR) slider in accordance with various embodiments.
Figure 2:
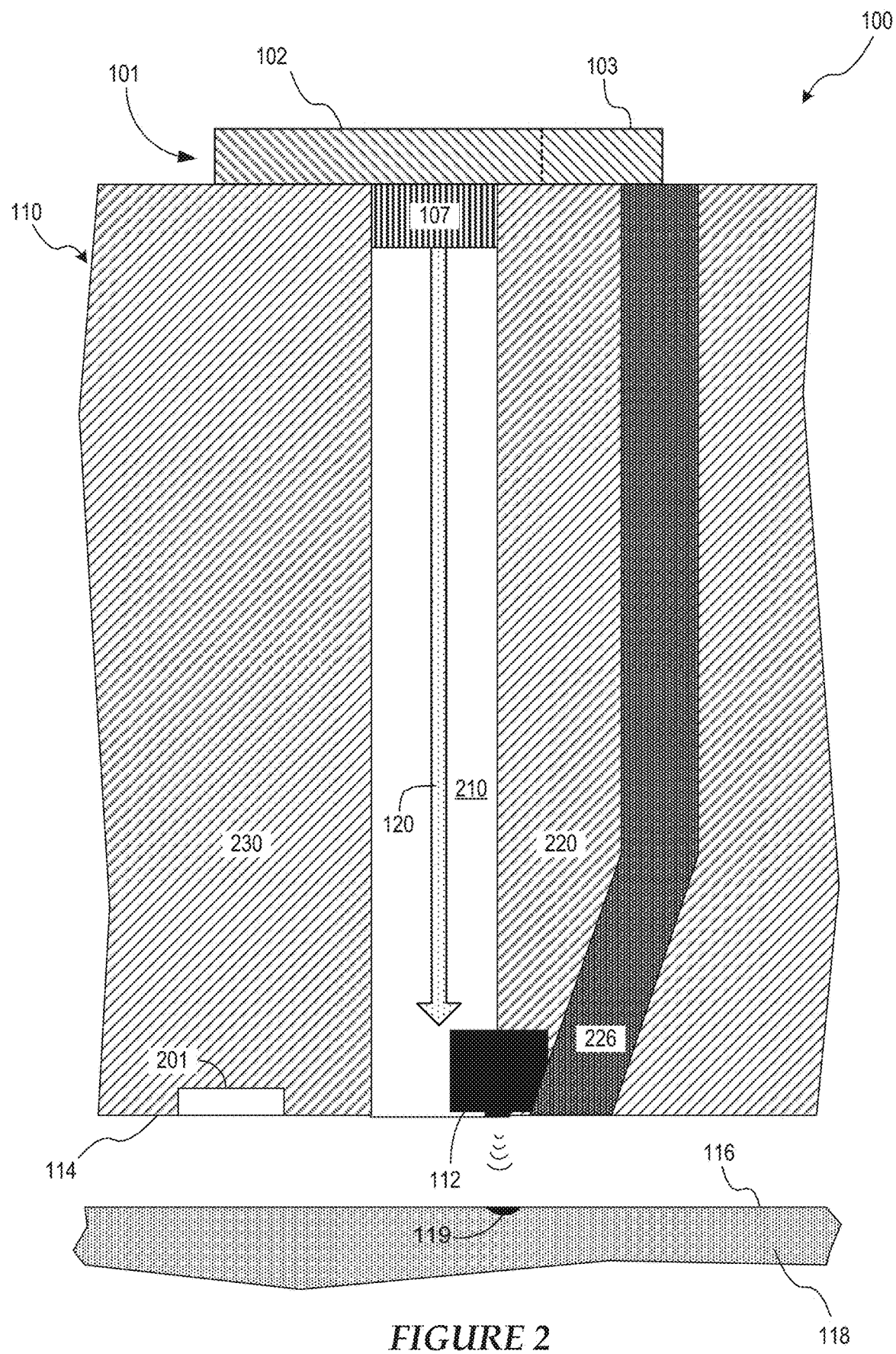
FIG. 2 shows a HAMR slider in accordance with various embodiments.

Embodiments of a HAMR slider 100 are illustrated in FIGS. 1 and 2. As shown, the head 100 (also referred to as a slider) includes a light source (e.g., a laser) 102 located proximate a trailing edge surface 104 of the slider body 105. The laser 102 is shown to include a laser stripe 102a in accordance with various embodiments. An optical wave (e.g., a laser beam) generated by the laser 102 is delivered to an NFT 112 via an optical waveguide 110. The NFT 112 is aligned with a plane of an air bearing surface (ABS) 114 of the head 100, and one edge of a read/write head 113 is on the ABS 114. While the representative embodiments of FIGS. 1 and 2 show the waveguide 110 integrated with the head 100, any type of light delivery configuration may be used. The laser 102 can be implemented as any type of semiconductor laser (e.g., laser diode, optically pumped semiconductor laser, quantum well laser).

The read/write head 113 includes at least one writer and at least one reader. In some embodiments, multiple writers (e.g., two writers) and multiple readers (e.g., three readers) can be incorporated into the read/write head 113. The ABS 114 faces, and is held proximate to, a surface 116 of a magnetic medium 118 during device operation. The ABS 114 is also referred to as a media-facing surface. The laser 102 in this representative example may be an integral, edge emitting device, although it will be appreciated that any source of electromagnetic energy may be used. For example, a surface emitting laser (SEL), instead of an edge emitting laser, may be used as the laser source 102. A laser 102 may also be mounted alternatively to other surfaces of the head 100, such as the trailing edge surface 104.

According to various embodiments, a heater 103 is thermally coupled to the laser 102. For example, the heater 103 can be situated in close proximity to, or incorporated as a component of, the laser 102. In various embodiments, the heater 103 includes one or a multiplicity of heating elements (referred to herein generally as heaters). In FIG. 1, the laser 102 and heater 103 are shown coupled to the slider body 105 via a submount 108. The submount 108 can be used to orient and affix the laser 102 (e.g., an edge-emitting laser) so that its output is directed downwards (negative y-direction in the figure). An input surface of the slider body 105 may include a grating, an optical coupler, or other coupling features to receive light from the laser 102. In some embodiments, the heater 103 is incorporated in or on the submount 108 that couples the laser 102 to the slider body 105. For example, one or more of the heaters 103 can be affixed to, or incorporated along, a surface of the submount 108 that contacts a surface of the laser 102. As is shown in FIG. 1, a heater 103a can be a heater of the submount 108 which is situated in abutment with the laser 102. The heater 103a can also be located on or in the laser 102. Combinations of heater/laser configurations are contemplated (e.g., a laser 102 comprising laser stripe 102a and heaters 103 and 103a).

The heater 103, 103a is configured to heat the laser 102 to improve the stability of output optical power of the laser 102. According to various embodiments, the heater 103, 103a is configured to change the temperature of a junction of the laser 102 from a temperature associated with laser output power instability to a temperature associated with laser output power stability. For example, the heater 103, 103a can be configured to pre-heat the laser 102 during times when the laser 102 is not lasing (e.g., prior to and/or after a write operation) and/or is lasing but not at an optical output sufficient for a write operation. The heater 103, 103a can also be configured to heat the laser 102 when the laser 102 is lasing during a write operation. During the write operation, the heater 103, 103a can steer the temperature of the laser away from a temperature associated with laser output power instability and towards a temperature associated with laser output power stability.

When writing with a HAMR device, electromagnetic energy is concentrated onto a small hotspot 119 over the track of the magnetic medium 118 where writing takes place, as is shown in the embodiment of FIG. 2. The light from the laser 102 propagates to the NFT 112, e.g., either directly from the laser 102 or through a mode converter or by way of a focusing element. FIG. 2, for example, shows an optical coupler 107 adjacent the laser 102, which is configured to couple light produced from the laser to the waveguide 110.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus, the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material on a substrate. In a HAMR slider 100, the NFT 112 is positioned proximate the write pole 226 of the read/write head 113. The NFT 112 is aligned with the plane of the ABS 114 parallel to the surface 116 of the magnetic medium 118. The waveguide 110 and optional mode converter 107 and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 to the Curie temperature as data is being recorded.

FIG. 2 shows a detailed partial cross-sectional view of an embodiment of the HAMR slider 100 in accordance with various embodiments. The waveguide 110 includes a layer of core material 210 surrounded by first and second cladding layers 220 and 230. The first cladding layer 220 is shown proximate the NFT 112 and the write pole 226. The second cladding layer 230 is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material.

The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

According to some embodiments, the head 100 includes one or more sensors, such as the sensor 201 shown in FIG. 2. In some embodiments, the sensor 201 can be a contact sensor configured to sense for one or more of head-medium contact, thermal asperities, and voids of a magnetic recording medium. In other embodiments, the sensor 201 can be a bolometer or a combined contact sensor/bolometer. The sensor 201 can be configured to produce a response to laser light that is used to detect laser output power instability, such as mode hops, in accordance with various embodiments. The sensor 201 can be a resistive sensor that can be implemented as a thermal sensor, such as a resistive temperature sensor (e.g., TCR sensor). The sensor 201 can be a thermoresistive/electric sensor or a piezoresistive/electrical sensor, for example. By way of further example, the sensor 201 can be a thermocouple or a thermistor. The sensor 201 can be situated at or near the ABS 114 and proximate the NFT 112. As such, the sensor 201 can also serve as a temperature sensor for the NFT 112 and as a head-medium/asperity contact sensor.

The output of a laser used in a HAMR drive is temperature sensitive and susceptible to self-heating. During a write operation, for example, laser heating can vary the junction temperature of the laser, causing a shift in laser emission wavelength, leading to a change of optical feedback from the optical path in the slider to the cavity of the laser, a phenomenon that is known to lead to mode hopping and/or power instability of the laser. Mode hopping is particularly problematic in the context of lasers emitting primarily a single frequency. Under some external influences, such a laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in lasers. Mode hopping is problematic for HAMR applications, as mode hopping leads to laser output power jumping and magnetic transition shifting from one data bit location (e.g., one block of data) to another. It is noted that the laser output power can jump in either direction (higher or lower) with a mode hop and that a jump in either direction is undesirable. Large transition shifts in a data bit location due to a mode hop may not be recoverable by channel decoding, resulting in error bits. Also, writing width varies with laser power so power fluctuations can lead to erasure of adjacent tracks or undesirably narrow written tracks. Heating the laser 102 by the heater 103, such as prior to and/or during a write operation, reduces temperature fluctuations at the laser junction, which serves to reduce the likelihood of mode hopping.

Figure 3:
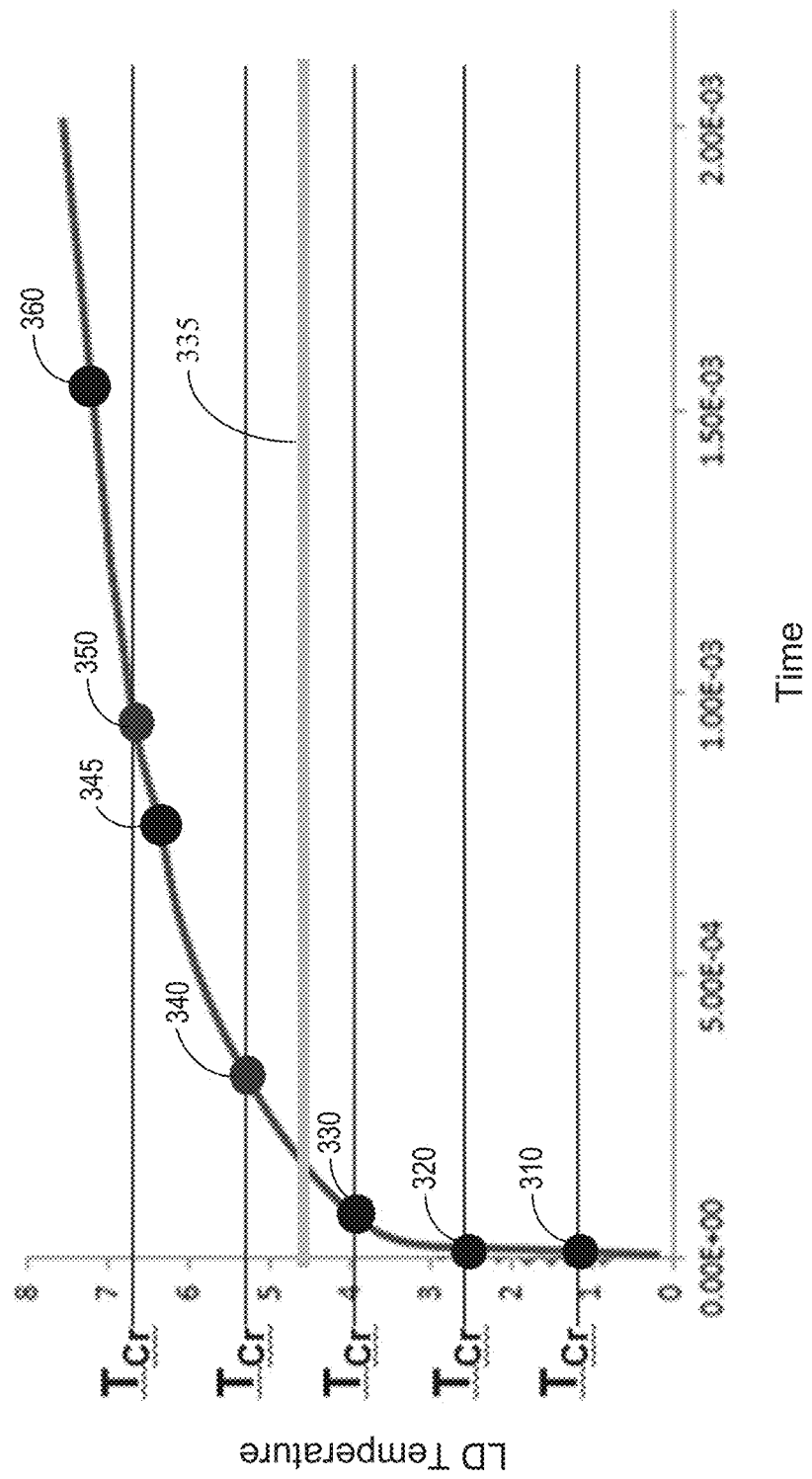
FIG. 3 shows a temperature versus time plot for a representative laser of a HAMR slider in accordance with various embodiments.

According to various implementations, and with reference to FIGS. 2 and 3, when the laser 102 heats up in response to a write request, instabilities in the system may arise. These instabilities may occur at specific critical temperatures ($T_{Cr}$). These critical temperatures may be different for every laser and/or may depend on various factors such as the current environment, for example. FIG. 3 shows the temperature versus time for a representative laser. In this example, there are five critical temperatures 310, 320, 330, 340, 350. When heating up a laser, the temperature rises quickly at first and then starts to level off. The critical temperatures are substantially periodic. Thus, more critical temperatures are experienced in a short period of time at the beginning of the heat-up process because the system is heating up more quickly than at later times. Therefore, it can be observed that the higher the slope of the temperature rise in time, the higher the probability of reaching a higher number of critical temperatures.

If the system can start pre-heating the laser to a temperature before the write process starts, the number of possible transitions though critical temperatures is reduced. If a pre-heat takes place and the system is heated to temperature 335 shown in FIG. 3, for example, the first three critical temperatures 310, 320, 330 are reached before the write operation starts and only two critical temperatures 340, 350 are experienced during the write operation. A system without a laser heating pre-heat feature would experience all five 310, 320, 330, 340, 350 critical temperatures in this example. Moreover, if the system can heat the laser during the write process, the laser temperature can be steered away from a critical temperature and into a region of laser output power stability between critical temperatures. For example, assume that a laser is at temperature 345 shown in FIG. 3 during a write operation and approaching critical temperature 350 during the write operation. Because the laser temperature 345 is approaching the critical temperature 350, the system may apply steering heat during the write operation in order to elevate the temperature of the laser away from the critical temperature 350 and to a higher temperature 360 associated with laser output power stability. The system preferably repeats the pre-heating and steering heat generation processes for subsequent write operations.

Figure 4:
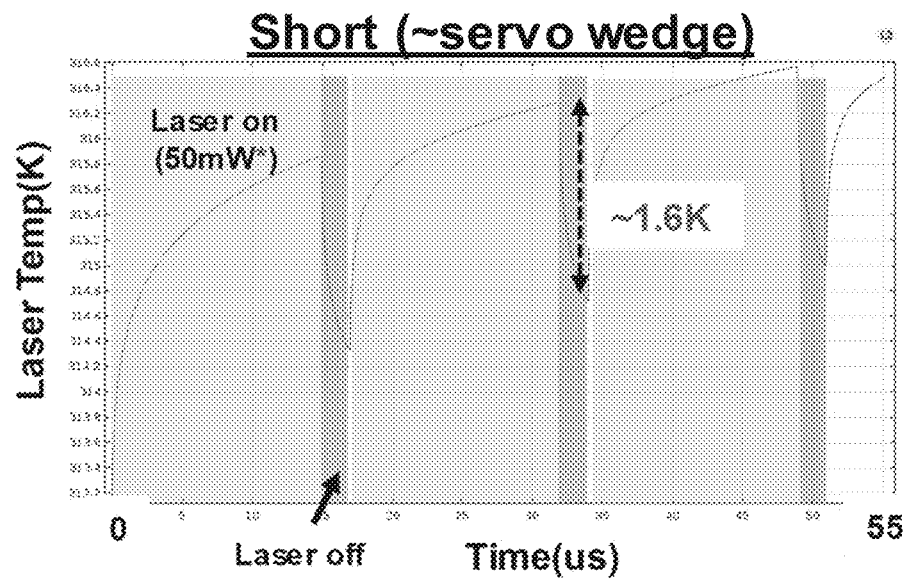
FIG. 4 shows a native laser-temperature variation of a representative HAMR laser for short time frames in accordance with various embodiments.
Figure 5:
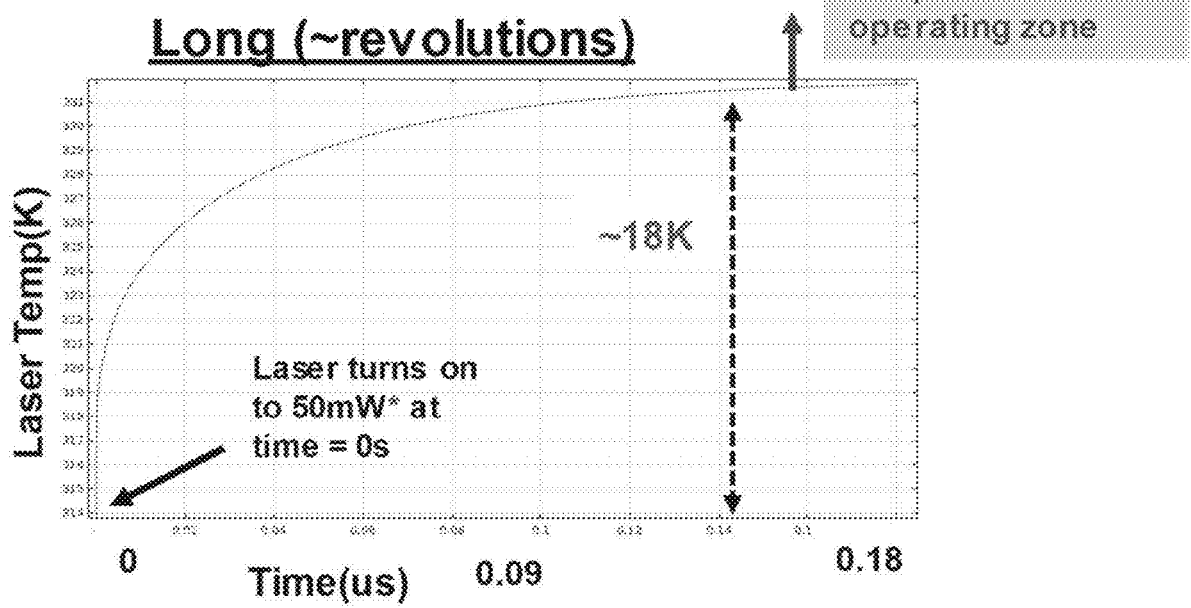
FIG. 5 shows a native laser-temperature variation of a representative HAMR laser for short time frames in accordance with various embodiments.

FIGS. 4 and 5 illustrate the native laser-temperature variation of a representative laser of a HAMR head without heating by a heater. It is noted that, for FIGS. 4 and 5, the laser turns on at 50 mW at time=0 sec. It is also noted that 50 mW represents thermal power absorbed in the laser, not the laser light output power. This convention is used in the discussion provided hereinbelow.

FIG. 4 shows the native laser-temperature variation of the laser for short time frames (e.g., ~15 μs for each of a sequence of servo wedges). The laser temperature variation between laser-on and laser-off conditions is about 1.6 K in the scenario shown in FIG. 4. FIG. 5 shows the native laser-temperature variation of the laser for a long time frame (e.g., multiple disk revolutions). The laser temperature variation between laser-on and laser-off conditions is about 18 K in the scenario shown in FIG. 5.

Provision of a heater to heat a laser of a HAMR head serves to achieve two primary objectives. The first objective is to bring the laser to its steady-state temperature prior to using the laser for writing. This function is referred to as "preheating," as discussed above. The second objective is to increase the laser temperature to the nearest stable operating temperature zone. This function is referred to as "steering," as discussed above. In some embodiments, the targeted steering range is about 5 K.

Embodiments of the disclosure are directed to a laser heating apparatus and method that can provide pre-heat (prior to a write operation) and/or steering heat (during a write operation) to the laser in a manner that improves the stability of output optical power of the laser.

Embodiments are directed to three different laser heating apparatus configurations, each of which can provide pre-heat (prior to a write operation) and/or steering heat (during a write operation) to the laser in a manner that improves the stability of output optical power of the laser.

Figure 6:
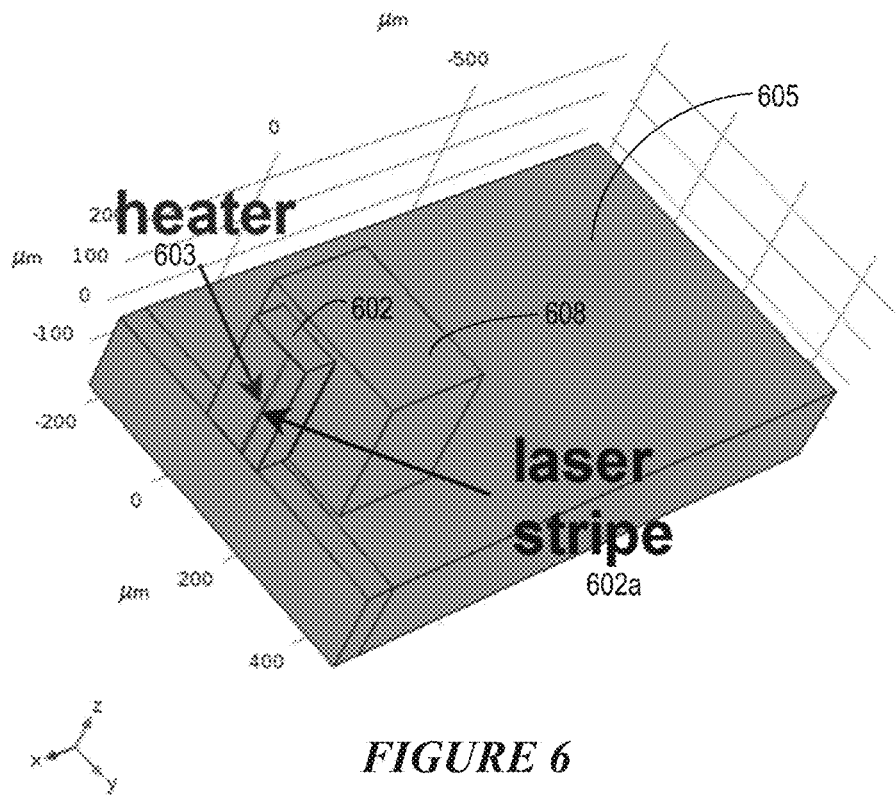
FIG. 6 illustrates a laser heating apparatus for use with a HAMR slider in accordance with various embodiments.

FIG. 6 illustrates a laser heating apparatus in accordance with various embodiments. FIG. 6 shows a slider body 605 and a submount 608 affixed to the slider body 605. A laser 602 is mounted to the submount 608 and includes a laser stripe 602a. In some embodiments, the laser 602 can be incorporated in a package referred to herein as a laser unit, which is mounted to the submount 608 and optically coupled to integrated optics of the slider body 605. The laser unit can include a substrate, the laser 602 (e.g., which includes a laser stripe 602a) on the substrate, and an enclosure around the laser 602 and substrate. In some configurations, the laser unit enclosure can house or support a first electrical contact, a substrate, an active layer between P and N cladding layers, a second electrical contact, and an output facet. The laser unit can also incorporate a heater 603 configured to heat the laser stripe 602a. According to various embodiments, the laser 602 has a structure in which the current is injected only within a narrow region beneath a stripe contact (shown as laser stripe 602a) which is typically several μm wide. This structure provides for a low threshold current and enhanced control of the optical field distribution.

The heater 603 can be a wire or thin metal stripe positioned proximate to, and extending along the length of, the laser stripe 602a of the laser 602. In the embodiment shown in FIG. 6, the heater 603 is embedded in or otherwise affixed to the laser 602 and positioned about 5 μm from the laser stripe 602a (shown as two closely spaced separate linear elements in FIG. 6).

Figure 7:
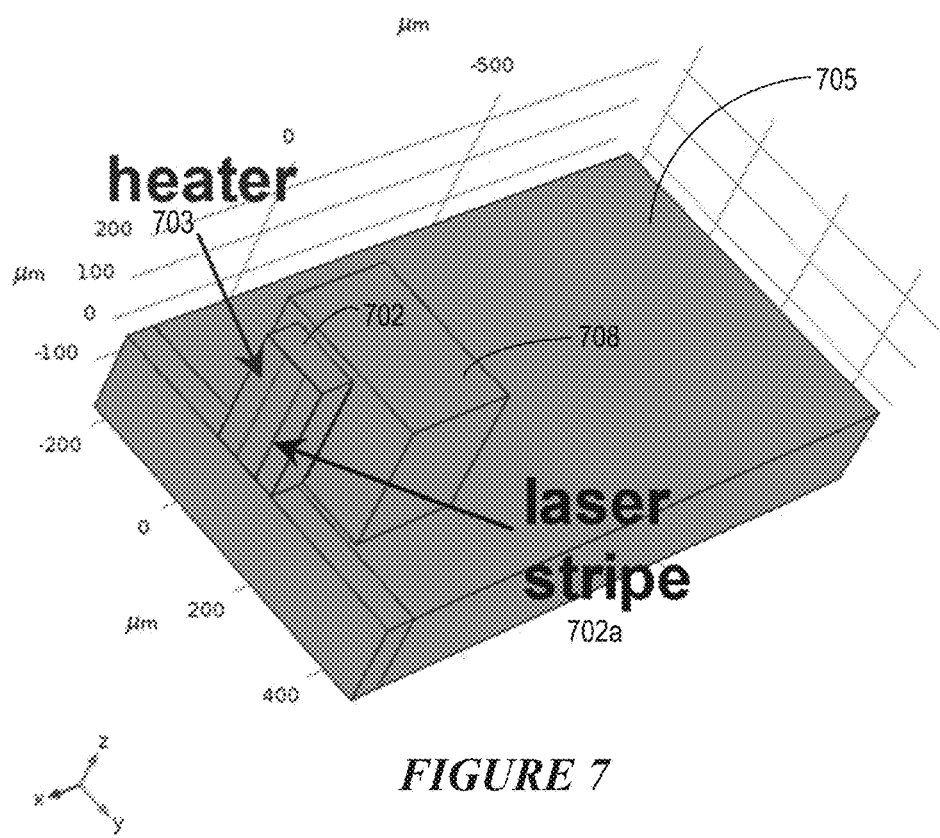
FIG. 7 illustrates a laser heating apparatus for use with a HAMR slider in accordance with various embodiments.

FIG. 7 illustrates a laser heating apparatus in accordance with various embodiments. FIG. 7 shows a slider body 705 and a submount 708 affixed to the slider body 705. A laser 702 is mounted to the submount 708 and includes a laser stripe 702a. In some embodiments, the laser 702 can be incorporated in a laser unit, details of which are provided above. The heater 703 can be a wire or thin metal stripe positioned proximate to, and extending along the length of, the laser stripe 702a of the laser 702. In the embodiment shown in FIG. 7, the heater 703 is embedded in or otherwise affixed to the laser 702 and positioned about 50 μm from the laser stripe 702a.

Figure 8:
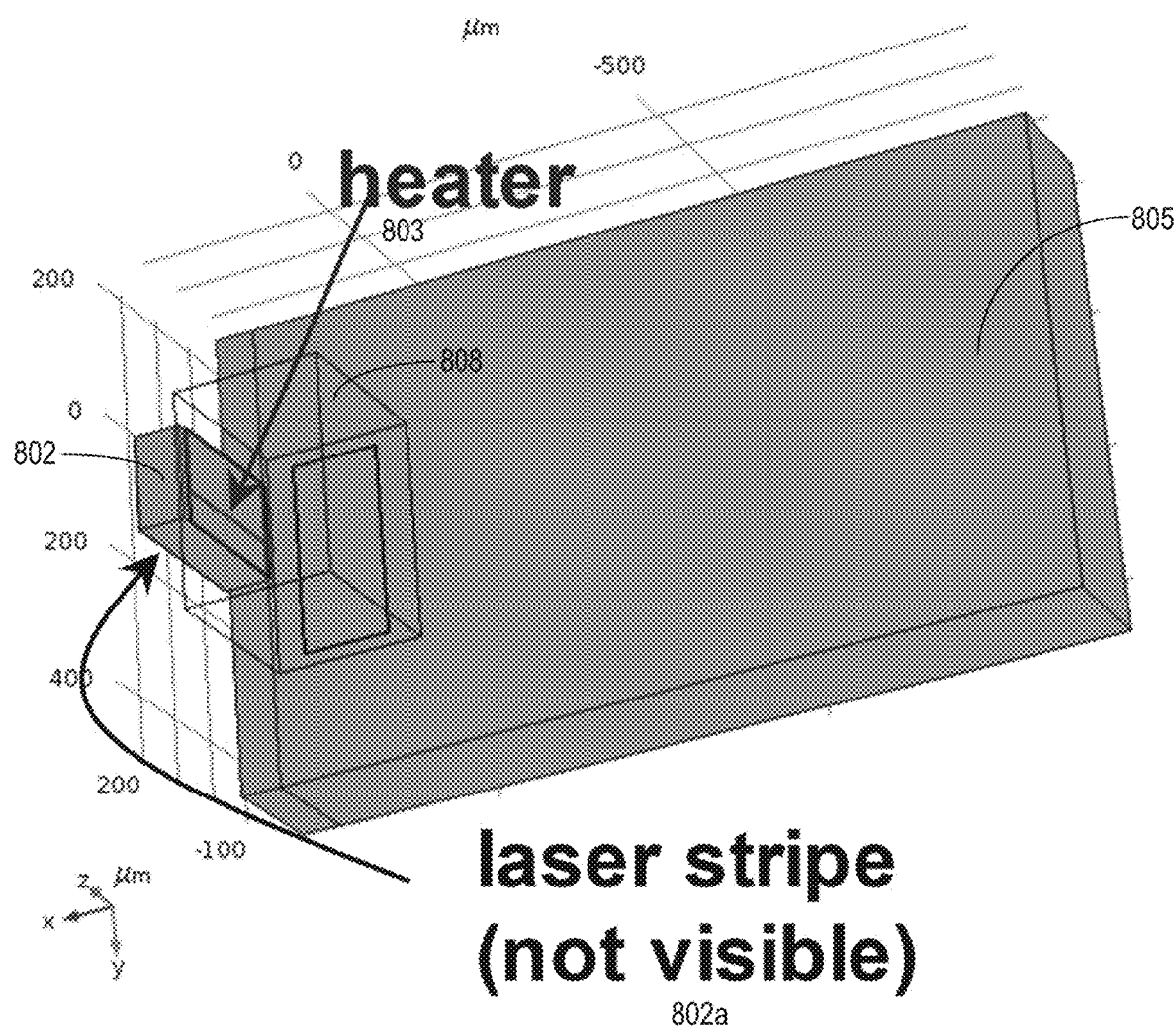
FIG. 8 illustrates a laser heating apparatus for use with a HAMR slider in accordance with various embodiments.

FIG. 8 illustrates a laser heating apparatus in accordance with various embodiments.

FIG. 8 shows a slider body 805 and a submount 808 affixed to the slider body 805. A laser 802 is mounted to the submount 808 and includes a laser stripe 802a (not visible in the view of FIG. 8). In some embodiments, the laser 802 can be incorporated in a laser unit, details of which are provided above. The heater 803 can be a wire or thin metal stripe embedded in the submount 808. The heater 803 can have a length equivalent to that of the laser stripe 802a. In this embodiment, the heater 803 is embedded in or otherwise affixed to the submount 808. For example, the heater 803 can be embedded in the submount 808 at a depth of about 5 μm below the submount surface (e.g., ~5 μm below the Under Bump Metallization or UBM). The heater 803 generates heat at the submount 808 which is conducted through the laser 802 (e.g., the laser unit) and to the laser stripe 802a. The heater 803 can be separated from the laser stripe 802a by a spacing approximately equal to the thickness of the laser 802 plus the thickness of the solder. For example, the heater 803 can be separated from the laser stripe 802a by a spacing that ranges from about 40 μm to about 120 μm (e.g., about 80 μm).

Temperature steering, preheat power, and preheat time effects for each of the laser heating apparatus configurations illustrated in FIGS. 6 and 8 are shown in FIGS. 9-14. It is noted that the performance of the laser heating apparatus configuration illustrated in FIG. 7 (heater-laser stripe spacing of 50 μm) is similar to that of the submount heater configuration shown in FIG. 8 and, therefore, is not provided herein.

Figure 10:
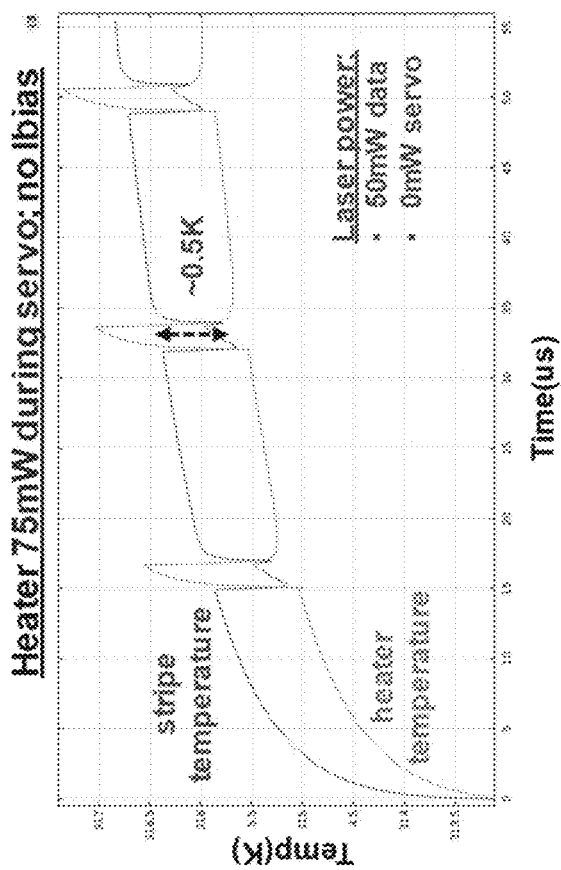
FIGS. 9 and 10 are plots demonstrating the ability of the laser heating apparatus shown in FIG. 6 to reduce short-time frame variation in laser temperature between laser-on and laser-off events.
Figure 9:
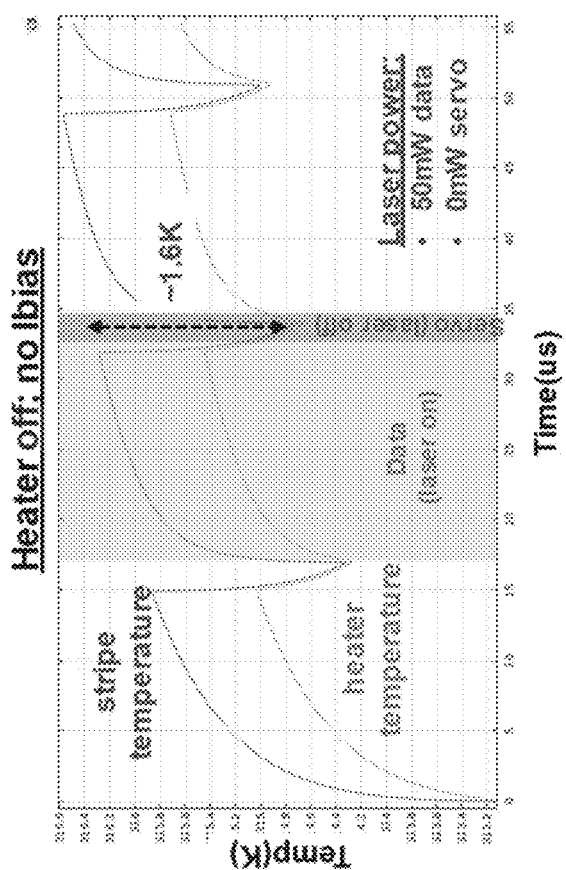

FIGS. 9 and 10 demonstrate the ability of the laser heating apparatus shown in FIG. 6 to reduce short-time frame variation in laser temperature between laser-on and laser-off events. FIG. 9 shows the native laser-temperature variation of the laser 602 (heater 603 off, no $I_{bias}$ current supplied to the laser) for short time frames (e.g., ~15 μs for each of a sequence of servo wedges). The laser temperature variation between laser-on and laser-off conditions is about 1.6 K in the scenario shown in FIG. 9. FIG. 10 shows the laser-temperature variation of the laser 602 with the heater 603 on (75 mW during servo, no $I_{bias}$ current supplied to the laser) for the same short time frames as those of FIG. 9. In FIG. 10, the laser temperature variation between laser-on and laser-off conditions is dramatically reduced from about 1.6 K (see FIG. 9) to about 0.5 K. FIG. 10 demonstrates that preheating the laser stripe 602a using the proximal heater 603 (at a spacing of ~5 μm) can significantly reduce laser temperature variations between laser-on and laser-off events, and reduce laser temperature ripple even on a microsecond time scale.

Figure 11C:
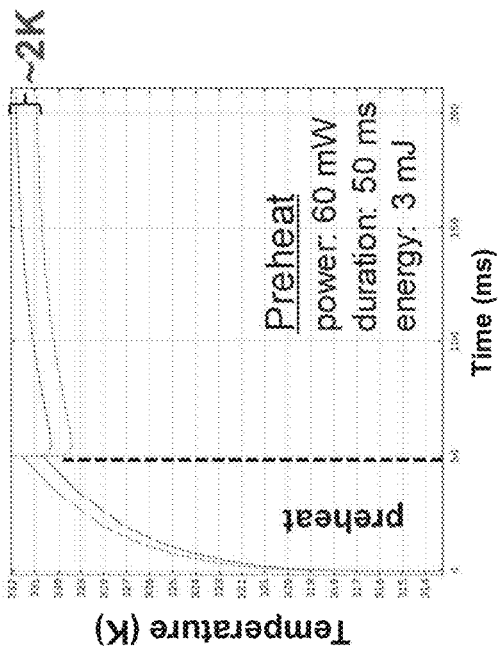
FIGS. 11A-11D show the effects of preheat power and duration on laser temperature as a function of time using the laser heating apparatus illustrated in FIG. 6.
Figure 11D:
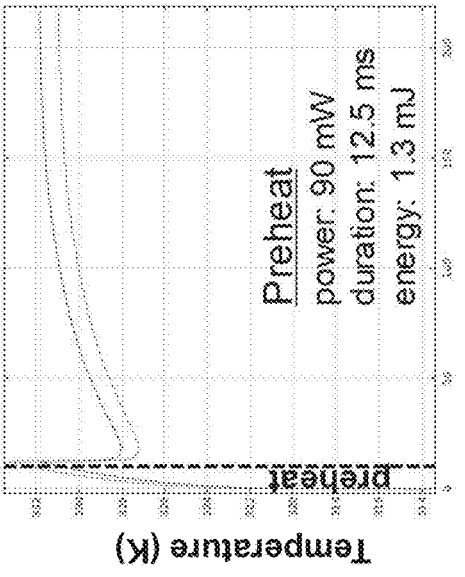
Figure 11A:
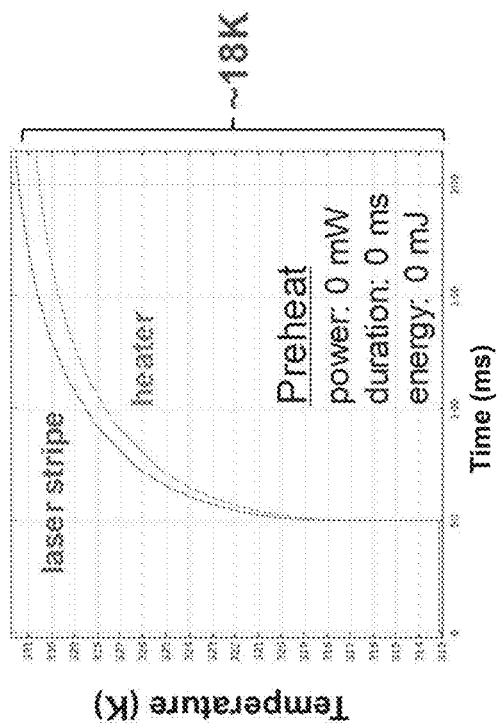
Figure 11B:
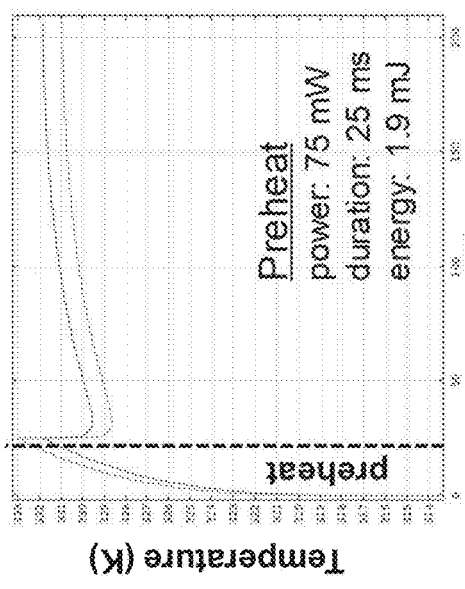

FIGS. 11A-11D show the effects of preheat power and duration on laser temperature as a function of time using the laser heating apparatus illustrated in FIG. 6 (spacing of ~5 μm between heater 603 and laser stripe 602a). FIG. 11A shows laser temperature as a function of time with no heater power applied (no preheat, 0 mW). FIGS. 11B, 11C, and 11D show plots of laser temperature versus time for different laser heating scenarios, each differing in terms of heater power (75 mW, 60 mW, 90 mW, respectively), duration (25 ms, 50 ms, 12.5 ms, respectively), and energy (1.9 mJ, 3 mJ, 1.3 mJ). In FIGS. 11B, 11C, and 11D, preheating power was applied from 0 sec to duration, and 50 mW of laser power was applied starting at duration.

For each of these heating scenarios, it can be seen that preheating the laser 602 using the proximal heater 603 significantly reduces the operational laser temperature variation in comparison to the no-heating scenario shown in FIG. 11A. For example, the ~18 K operational laser temperature variation shown in FIG. 11A (no laser heating) is reduced to about 2 K in the heating scenario shown in FIG. 11C. FIGS. 11A-11D demonstrate that a nearly 90% reduction in operational temperature variation of the laser 602 can be achieved using the proximal heater 603. Moreover, various preheat durations, waveforms, and power can be used.

Figure 12B:
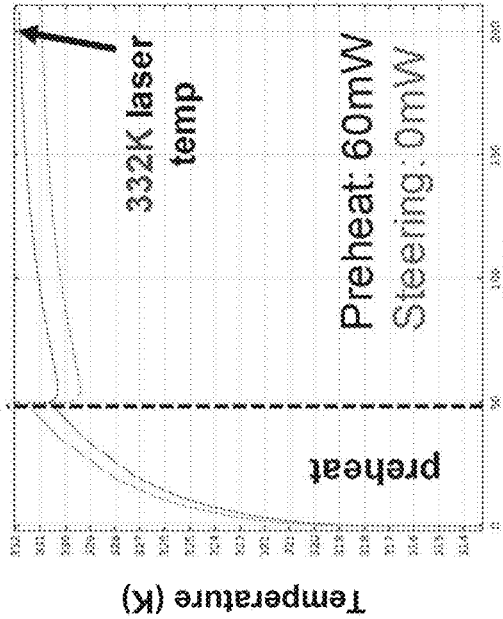
FIGS. 12A-12D show the effects of preheat power and duration and steering heating on laser temperature as a function of time using the laser heating apparatus illustrated in FIG. 6.
Figure 12D:
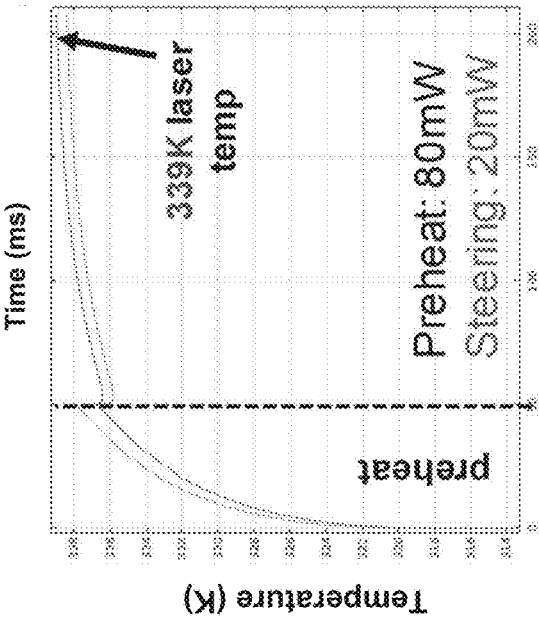
Figure 12A:
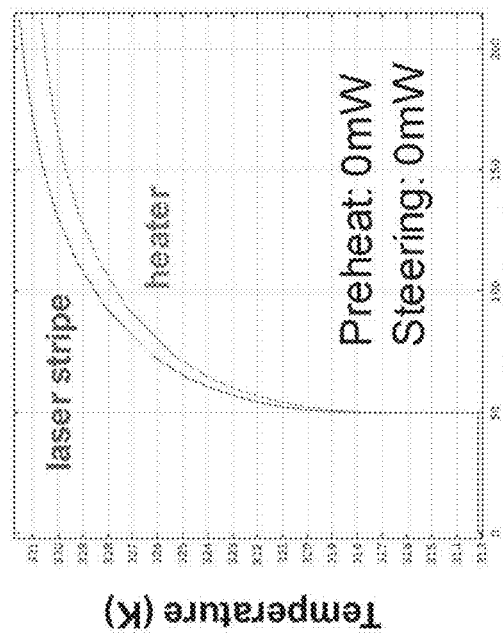
Figure 12C:
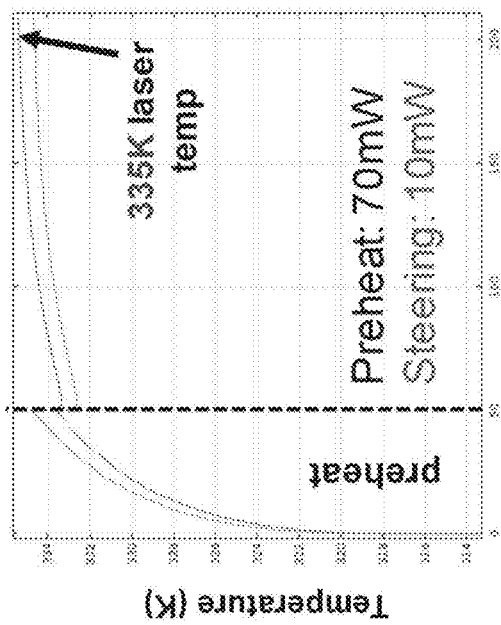

FIGS. 12A-12D show the effects of preheat power and duration and steering heating on laser temperature as a function of time using the laser heating apparatus illustrated in FIG. 6 (spacing of ~5 μm between heater 603 and laser stripe 602a). FIG. 12A shows laser temperature as a function of time with no heater power applied (no preheat, no steering heat). FIG. 12B shows a plot of laser temperature versus time with 60 mW of preheat but no steering heating. FIG. 12C shows a plot of laser temperature versus time with 70 mW of preheat and 10 mW of steering heating. FIG. 12D shows a plot of laser temperature versus time with 80 mW of preheat and 20 mW of steering heating.

In FIGS. 12A-12D, 50 mW of power was delivered to the laser 602 at 50 ms and afterward. In FIGS. 12B, 12C, and 12D, power delivered to the heater 603 for preheating was applied from 0 sec to 50 ms. Power delivered to the heater 603 for steering was applied from 50 ms onward. FIGS. 12A-12D demonstrate that laser temperature steering can be achieved using the laser heating apparatus shown in FIG. 6. For example, 14 mW of power delivered to the heater 603 can achieve a targeted 5 K of laser temperature steering. Also, a steering efficiency (laser temperature change per heater power) of 0.35 K/mW can be achieved using the laser heating apparatus shown in FIG. 6.

Figure 13C:
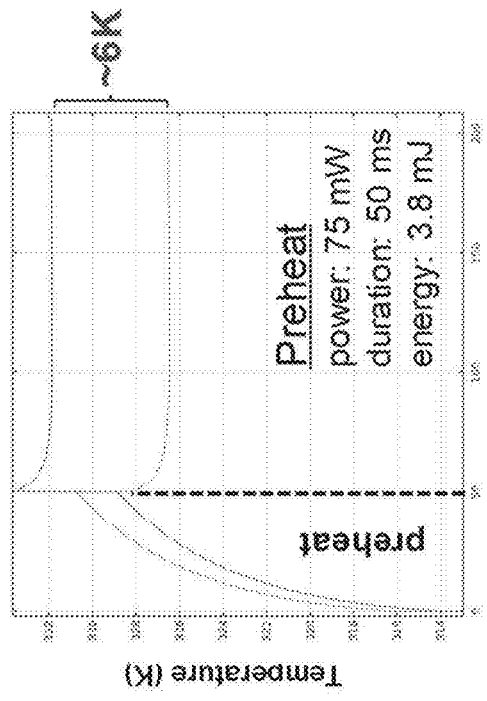
FIGS. 13A-13D show the effects of preheat power and duration on laser temperature as a function of time using the laser heating apparatus illustrated in FIG. 8.
Figure 13D:
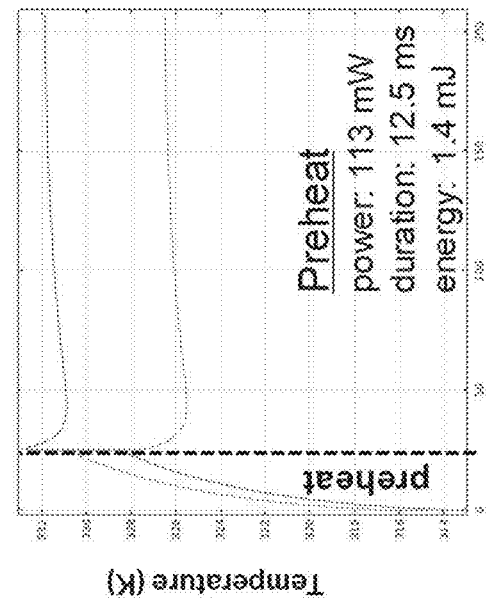
Figure 13A:
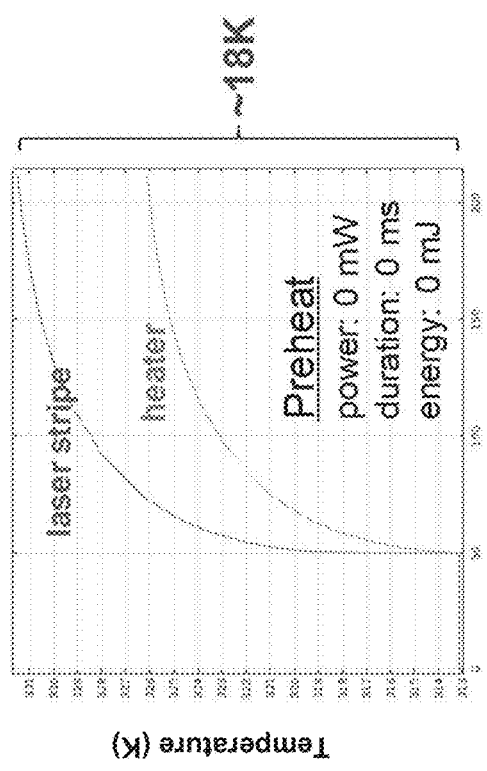
Figure 13B:
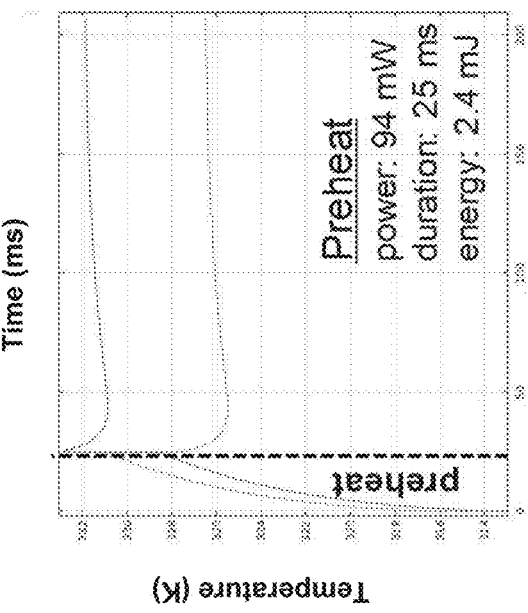

FIGS. 13A-13D show the effects of preheat power and duration on laser temperature as a function of time using the laser heating apparatus illustrated in FIG. 8 (heater 803 embedded in submount 808). FIG. 13A shows laser temperature as a function of time with no heater power applied (no preheat). FIGS. 13B, 13C, and 13D show plots of laser temperature versus time for different laser heating scenarios, each differing in terms of heater power (94 mW, 75 mW, 113 mW, respectively), duration (25 ms, 50 ms, 12.5 ms, respectively), and energy (2.4 mJ, 3.8 mJ, 1.4 mJ). In FIGS. 13B, 13C, and 13D, preheating power was applied from 0 sec to duration, and 50 mW of laser power was applied starting at duration.

For each of these heating scenarios, it can be seen that preheating the laser 802 using the submount heater 803 significantly reduces the operational laser temperature variation in comparison to the no-heating scenario shown in FIG. 13A. For example, the ~18 K operational laser temperature variation shown in FIG. 13A (no laser heating) is reduced to about 6 K in the heating scenario shown in FIG. 13C. FIGS. 13A-13D demonstrate that a nearly 65% reduction in operational temperature variation of the laser 802 can be achieved using the submount heater 803. Moreover, various preheat durations, waveforms, and power can be used.

Figure 14A:
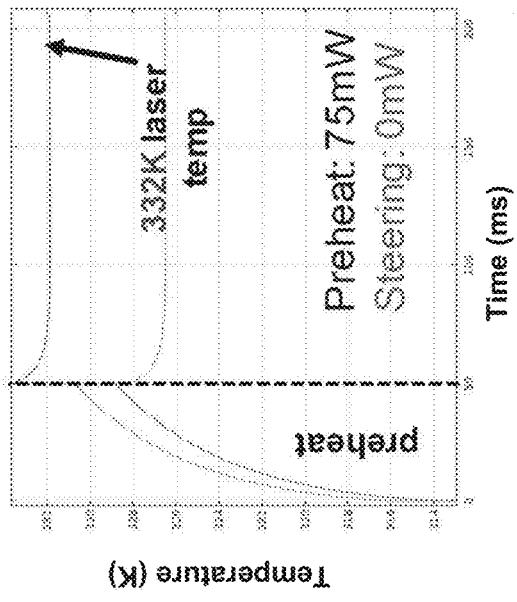
FIGS. 14A-14D show the effects of preheat power and duration and steering heating on laser temperature as a function of time using the laser heating apparatus illustrated in FIG. 8.
Figure 14B:
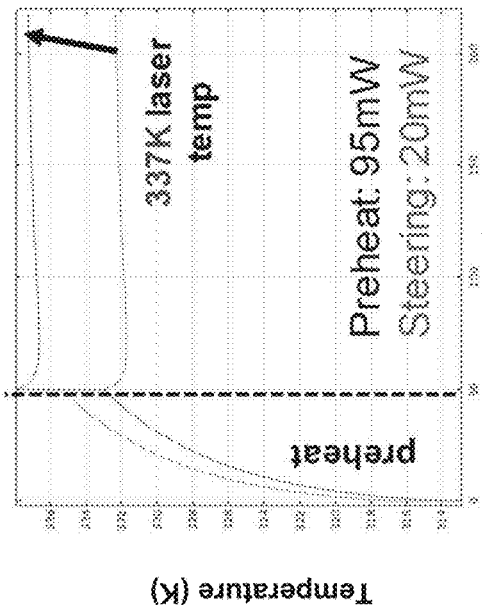
Figure 14C:
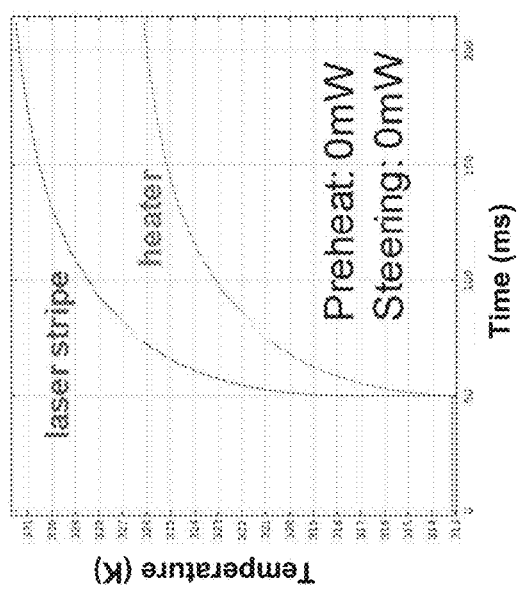
Figure 14D:
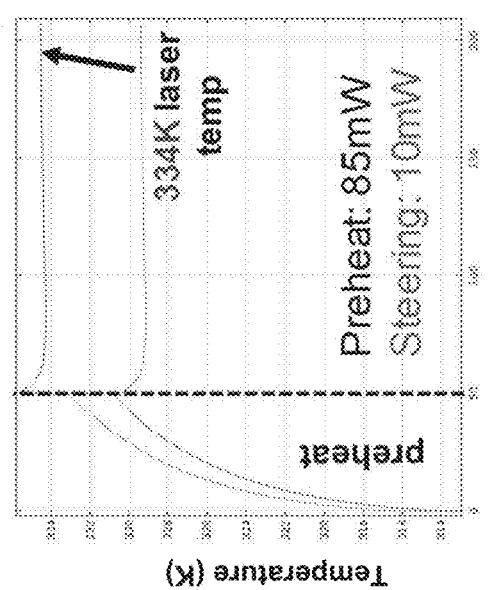

FIGS. 14A-14D show the effects of preheat power and duration and steering heating on laser temperature as a function of time using the laser heating apparatus illustrated in FIG. 8 (submount heater 803 and laser stripe 802a). FIG. 14A shows laser temperature as a function of time with no heater power applied (no preheat, no steering heat). FIG. 14B shows a plot of laser temperature versus time with 75 mW of preheat but no steering heating. FIG. 14C shows a plot of laser temperature versus time with 85 mW of preheat and 10 mW of steering heating. FIG. 14D shows a plot of laser temperature versus time with 95 mW of preheat and 20 mW of steering heating.

In FIGS. 14A-14D, 50 mW of power was delivered to the laser 802 at 50 ms and afterward. In FIGS. 14B, 14C, and 14D, power delivered to the heater 803 for preheating was applied from 0 sec to 50 ms. Power delivered to the heater 803 for steering was applied from 50 ms and onward. FIGS. 14A-14D demonstrate that laser temperature steering can be achieved using the laser heating apparatus shown in FIG. 8. For example, 20 mW of power delivered to the heater 803 can achieve a targeted 5 K of laser temperature steering. Also, a steering efficiency of 0.25 K/mW can be achieved using the laser heating apparatus shown in FIG. 8.

Although various embodiments described herein specify a particular spacing between a heater and a laser of a laser heating apparatus, other spacings can be implemented. For example, the spacing between the heater 603 and the laser stripe 602a in the embodiment of FIG. 6 can range from about 2 to 25 µm (e.g., 3-20 µm, 4-15 µm, 5-10 µm). By way of further example, the spacing between the heater 703 and the laser stripe 702a in the embodiment of FIG. 7 can range from about 30 to 70 µm (e.g., from 35-65 µm or 45-55 µm). Other spacings between a heater and a laser of a laser heating apparatus are contemplated (e.g., any spacing or spacing range from about 2 µm to about 120 µm).

FIG. 15 is a flow chart showing processes for heating a laser of a heat assisted magnetic recording slider in accordance with various embodiments. The method illustrated in FIG. 15 involves moving 1502 a slider relative to a magnetic recording medium, the slider configured for heat assisted magnetic recording and comprising a submount to which a laser unit is affixed. The method involves operating 1504 a laser of the laser unit in a non-lasing state and a lasing state. The method also involves controlling 1506 a heater embedded in the laser unit or the submount to generate preheat for heating the laser during the non-lasing state and to generate steering heat for heating the laser during the lasing state. In some embodiments, the method further involves controlling 1508 the heater to cause the heater to generate the preheat and the steering heat to avoid a temperature associated with power instability of the laser when in the lasing state during a write operation.

Figure 16:
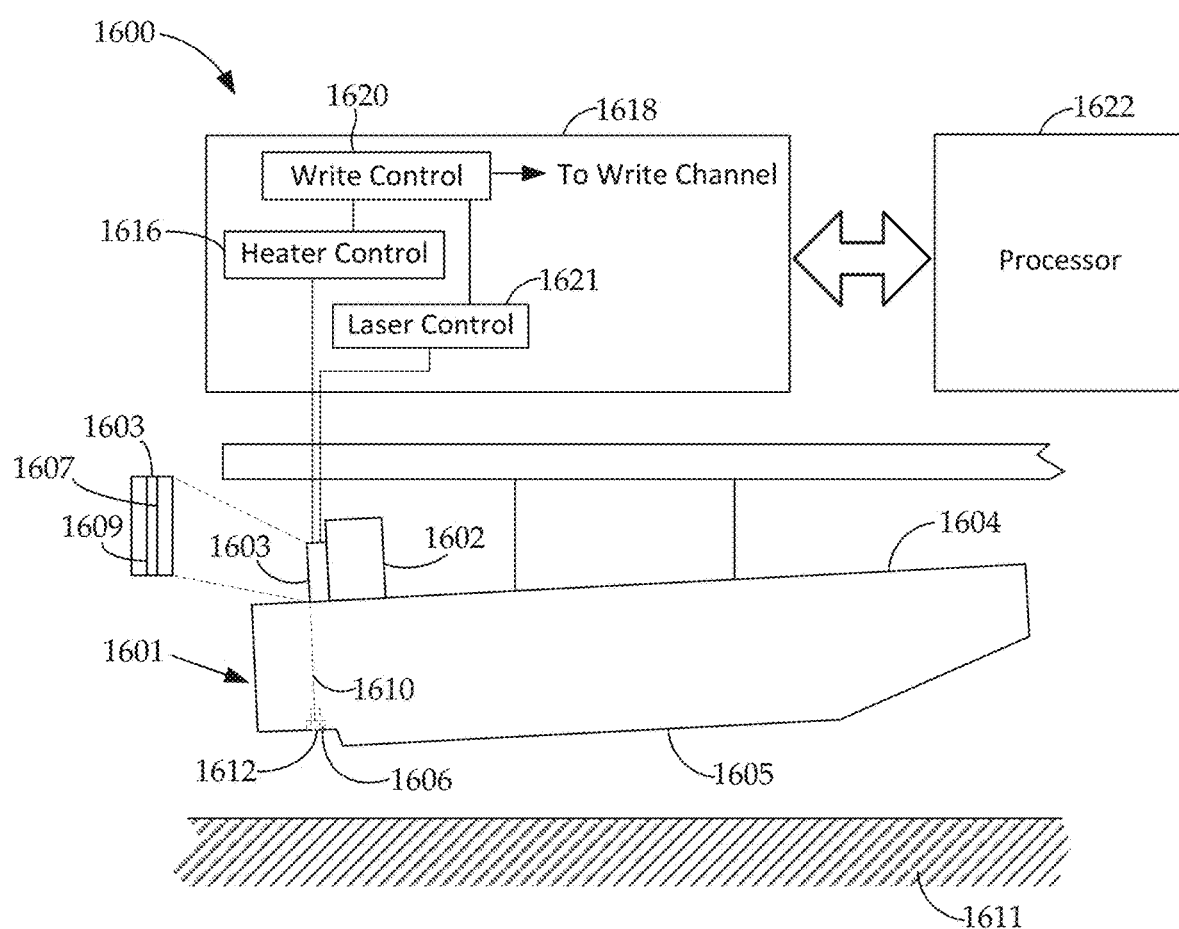
FIG. 16 is a schematic view of a representative HAMR apparatus and related components that can utilize heating of a laser to reduce laser output power instability according to various embodiments.

FIG. 16 is a schematic view of a representative HAMR apparatus 1600 and related components that can utilize heating of a laser to reduce laser output power instability (e.g., mode hopping) according to various embodiments. The example embodiment shown in FIG. 16 has a laser-on-slider (LOS) configuration. In FIG. 16, the apparatus 1600 includes a slider body 1601 having a first surface 1604 and an air bearing surface 1605. A submount 1602 is affixed on the first surface 1604 of the slider body 1601. A laser unit 1603 is affixed to the submount 1602 and includes a heater 1607 and a laser 1609. The heater 1607 and laser 1609 can be positioned relative to one another and have a spacing therebetween as previously described. The laser 1609 is situated proximate to a HAMR read/write element 1606, which has one edge on the air bearing surface 1605 of the slider body 1601. The air bearing surface 1605 faces and is held proximate to a moving magnetic recording medium 1611 during device operation.

While here the read/write element 1606 is shown as a single unit, this type of device may have a physically and electrically separate read element (e.g., magnetoresistive stack) and write element (e.g., a write coil and pole) that are located in the same general region of the slider body 1601. The separate read and write portion of the read/write element 1606 may be separately controlled (e.g., having different signal lines, different head-to-media spacing control elements, etc.), although they may share some common elements (e.g., common signal return path). It is understood that the concepts described herein relative to the read/write element 1606 may be applicable to individual read or write portions thereof, and may be also applicable where multiple ones of the read/write portions are used (e.g., two or more read elements, two or more write elements, etc.).

The laser 1609 provides electromagnetic energy to heat the media surface at a point near to the read/write element 1606. Optical path components, such as a waveguide 1610, can be formed integrally within the slider body 1601 to deliver light from the laser 1609 to the recording medium 1611. In particular, a local waveguide and NFT 1612 may be located proximate the read/write element 1606 to provide local heating of the media during write operations. The NFT 1612 is designed to support local surface-plasmons at a designed light wavelength. At resonance, high electric field surrounds the NFT 1612 due to the collective oscillation of electrons in the metal. Part of the field is directed into the recording medium 1611 and gets absorbed, raising the temperature of the recording medium 1611 locally for recording.

In FIG. 16, the laser unit 1603 includes a heater 1607 comprising one or more heating elements configured to warm the laser 1609 in a manner previously described. In FIG. 16, a processor (e.g., an analyzer) 1622 is illustrated communicating with a controller 1618. The processor 1622 can be configured to determine a temperature of the laser, such as by use of a thermal sensor (e.g., sensor 201 shown in FIG. 2) proximate or integral to the laser unit 1603.

Additionally, the processor 1622 can determine laser output power (e.g., from a photodiode), and compare laser temperature and an injection current supplied during the lasing state to stored combinations of laser temperature and injection current to determine a likelihood of mode hopping occurring for the laser during the lasing state. The controller 1618 can communicate with the processor 1622 and can be configured to vary the current supplied to the heater 1607 for varying a temperature of the laser to reduce the likelihood of mode hopping occurring during the lasing state.

The controller 1618 shown in FIG. 16 includes a heater control 1616 coupled to the heater 1607 and a laser control 1621 coupled to the laser 1609. The controller 1618 communicates with the laser control 1621 to control lasing of the laser 1609 and communicates with the heater control 1616 to control when the heater 1607 is turned on and off relative to the non-lasing state and the lasing state. Typically, the controller 1618 can be used to control an amount of injection current supplied to the laser 1609 and an amount of current supplied to the heater 1607 to vary the laser temperature in a manner previously described.

The controller 1618 can include a write control module 1620 that controls various aspects of the device during write operations. For a HAMR device, writing involves activating the laser 1609 while writing to the recording medium 1611. The laser control 1621 includes circuitry that switches the laser 1609 on and off, e.g., in response to commands from write control module 1620. The heater control 1616 can activate the heater 1607 during at least a portion of the non-lasing state and at least a portion of the lasing state to warm the laser 1609 in a manner previously discussed.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider configured to facilitate heat assisted magnetic recording and comprising a submount;
   a laser unit disposed at the submount and comprising a laser operable in a non-lasing state and a lasing state; and
   a heater embedded in the laser unit or the submount, the heater configured to one or both of generate preheat for heating the laser during the non-lasing state and generate steering heat for heating the laser during the lasing state.

2. The apparatus of claim 1, wherein the heater is configured to one or both of generate the preheat and the steering heat to avoid a temperature associated with power instability of the laser when in the lasing state during a write operation.

3. The apparatus of claim 1, wherein the heater is separated from the laser by a spacing ranging from about 2 μm to about 120 μm.

4. The apparatus of claim 1, wherein the heater is embedded in the laser unit and separated from the laser by a spacing ranging from about 2 μm to about 25 μm.

5. The apparatus of claim 1, wherein the heater is embedded in the laser unit and separated from the laser by a spacing ranging from about 30 μm to about 70 μm.

6. The apparatus of claim 1, wherein the heater is embedded in the submount and separated from the laser by a spacing ranging from about 40 μm to about 120 μm.

7. The apparatus of claim 1, wherein:
   a first heater is embedded in the laser unit and a second heater is embedded in the submount; and
   the first and second heaters are configured to one or both of generate preheat for heating the laser during the non-lasing state and generate steering heat for heating the laser during the lasing state.

8. The apparatus of claim 1, wherein the heater comprises a resistive wire.

9. The apparatus of claim 1, wherein:
   the laser comprises a laser stripe; and
   the heater and the laser stripe are disposed on the same surface of the laser unit.

10. The apparatus of claim 1, wherein:
    the laser comprises a laser stripe; and
    the heater and the laser stripe are disposed on opposing surfaces of the laser unit.

11. An apparatus, comprising:
    a slider configured to facilitate heat assisted magnetic recording and comprising a submount;
    a laser unit disposed at the submount and comprising a laser operable in a non-lasing state and a lasing state;
    a heater embedded in the laser unit or the submount; and
    control circuitry coupled the laser unit and the heater, the control circuitry configured to cause the heater to one or both of generate preheat for heating the laser during the non-lasing state and cause the heater to generate steering heat for heating the laser during the lasing state.

12. The apparatus of claim 11, wherein the control circuitry is configured to one or both of cause the heater to generate the preheat and the steering heat to avoid a temperature associated with power instability of the laser when in the lasing state during a write operation.

13. The apparatus of claim 11, wherein the heater is embedded in the laser unit and separated from the laser by a spacing ranging from about 2 μm to about 25 μm.

14. The apparatus of claim 11, wherein the heater is embedded in the laser unit and separated from the laser by a spacing ranging from about 30 μm to about 70 μm.

15. The apparatus of claim 11, wherein the heater is embedded in the submount and separated from the laser by a spacing ranging from about 40 μm to about 120 μm.

16. The apparatus of claim 11, wherein:
    a first heater is embedded in the laser unit and a second heater is embedded in the submount; and
    the first and second heaters are configured to one or both of generate preheat for heating the laser during the non-lasing state and generate steering heat for heating the laser during the lasing state.

17. The apparatus of claim 11, wherein the heater comprises a resistive wire.

18. The apparatus of claim 11, wherein the laser comprises a laser stripe.

19. A method, comprising:
    moving a slider configured for heat assisted magnetic recording relative to a magnetic recording medium, the slider comprising a submount and a laser unit disposed at the submount;
    operating a laser of the laser unit in a non-lasing state and a lasing state; and
    controlling a heater embedded in the laser unit or the submount to one or both of generate preheat for heating the laser during the non-lasing state and generate steering heat for heating the laser during the lasing state.

20. The method of claim 19, wherein controlling the heater comprises causing the heater to one or both of generate the preheat and the steering heat to avoid a temperature associated with power instability of the laser when in the lasing state during a write operation.

* * * * *